(12) United States Patent  
Miura

(10) Patent No.: US 7,474,843 B2  
(45) Date of Patent: Jan. 6, 2009

(54) DIGITAL CAMERA

(75) Inventor: Yuri Miura, Miyagi (JP)

(73) Assignee: Fujifilm Corporation, Kanagawa (JP)

( * ) Notice: Subject to any disclaimer, the term of this patent is extended or adjusted under 35 U.S.C. 154(b) by 379 days.

(21) Appl. No.: 11/448,675

(22) Filed: Jun. 8, 2006

(65) Prior Publication Data

US 2006/0280490 A1    Dec. 14, 2006

(30) Foreign Application Priority Data

Jun. 10, 2005   (JP)   ............. P.2005-170783

(51) Int. Cl.
*G03B 17/00*    (2006.01)
(52) U.S. Cl. ............... 396/52; 396/55; 348/208.99; 348/208.4; 348/208.5; 348/208.12; 348/208.13; 348/208.16
(58) Field of Classification Search ............ 396/52, 396/55; 348/208.99, 208.4, 208.5, 208.12, 348/208.13, 208.16
See application file for complete search history.

(56) References Cited

U.S. PATENT DOCUMENTS

| | | | |
|---|---|---|---|
| 5,237,365 A * | 8/1993 | Miyazawa | 396/49 |
| 5,319,456 A * | 6/1994 | Nishida et al. | 348/699 |
| 6,141,498 A * | 10/2000 | Hara | 396/55 |
| 6,940,542 B2 * | 9/2005 | Kitazawa et al. | 348/208.99 |
| 2001/0048475 A1 * | 12/2001 | Shiomi | 348/208 |
| 2006/0127071 A1 * | 6/2006 | Takeuchi et al. | 396/55 |

FOREIGN PATENT DOCUMENTS

JP    2004-191647 A    7/2004

* cited by examiner

*Primary Examiner*—W. B. Perkey
*Assistant Examiner*—Michael A Strieb
(74) *Attorney, Agent, or Firm*—Birch, Stewart, Kolasch & Birch, LLP

(57) ABSTRACT

A digital camera, having a function for optically compensating for camera shake, comprises: a movement detector that detects a movement of the digital camera; a movement prediction unit that employs the movement detected by the movement detector to predict a movement of the digital camera after a predetermined period of time has elapsed; an optical system moving unit that moves an optical system of the digital camera so as to compensate for the movement of the digital camera predicted by the movement prediction unit; and an image data correction unit that corrects image data obtained while taking a photograph, based on a difference between an actual movement of the digital camera, which is detected by the movement detector while taking the photograph, and the movement of the digital camera that is predicted, by the movement prediction unit, to occur while taking the photograph, so that the image data will be the same as image data that are obtained when the optical system is moved while taking the photograph in order to compensate for the movement of the digital camera that is detected by the movement detector while actually taking the photograph.

1 Claim, 1 Drawing Sheet

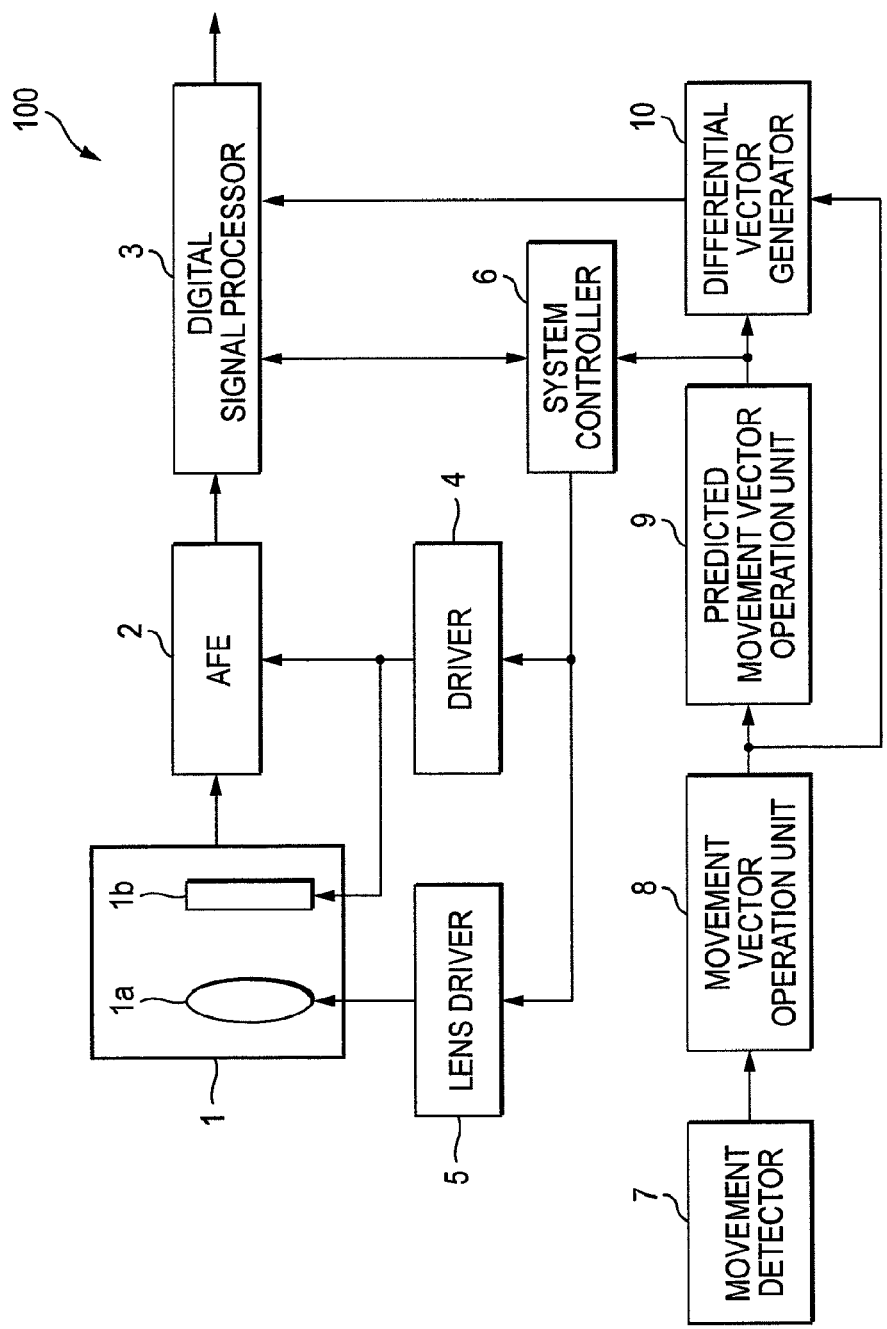

DIGITAL CAMERA

BACKGROUND OF THE INVENTION

1. Field of the Invention

The present invention relates to a digital camera that has a function for optically compensating for camera shake.

2. Description of the Related Art

An image pickup apparatus that selectively employs the function for optically compensating for camera shake and a function for performing signal processing to compensate for camera shake is disclosed in JP-A-2004-191647.

In a digital camera having an optical camera shake compensation function, camera shake compensation is performed by moving the optical system to counter the movement of a digital camera while taking a photograph. However, since there is a short delay between the detection of the movement of a digital camera and the movement of the optical system to compensate for it, the photographic process can be completed before the optical system can be moved to compensate for the movement of the digital camera. Conventionally, therefore, based on past performance, the movement of the digital camera during the taking a photograph is predicted, and when a photograph is being taken, the predicted movement of the digital camera is countered by the movement of the optical system, i.e., the performance of the camera shake compensation function.

According to the invention, however, when a difference exists between the predicted and the actual movements of a digital camera while taking a photograph, accurate camera shake compensation can not be provided.

SUMMARY OF THE INVENTION

While taking the above shortcoming into account, one objective of the present invention is to enable a digital camera having an optical camera shake compensation function to perform accurate camera shake compensation.

To achieve this objective, according to this invention, a digital camera, having a function for optically compensating for camera shake, comprises:

a movement detector that detects a movement of the digital camera;

a movement prediction unit that employs the movement detected by the movement detector to predict a movement of the digital camera after a predetermined period of time has elapsed;

an optical system moving unit that moves an optical system of the digital camera so as to compensate for the movement of the digital camera predicted by the movement prediction unit; and an image data correction unit that corrects image data obtained while taking a photograph, based on a difference between an actual movement of the digital camera, which is detected by the movement detector while taking the photograph, and the movement of the digital camera that is predicted, by the movement prediction unit, to occur while taking the photograph, so that the image data will be the same as image data that are obtained when the optical system is moved while taking the photograph in order to compensate for the movement of the digital camera that is detected by the movement detector while actually taking the photograph.

With this arrangement, when there is a difference between the movement of the digital camera that has been predicted will occur while taking a photograph and the actual movement of the digital camera, the same image data are generated as those obtained when the optical system has been moved to counter the actual movement of the digital camera. Therefore, accurate camera shake compensation can be performed.

BRIEF DESCRIPTION OF THE DRAWINGS

FIG. 1 is a schematic diagram showing the configuration of the essential portion of a digital camera for carrying out the present invention.

DETAILED DESCRIPTION OF THE INVENTION

One embodiment of the present invention will now be described while referring to a drawing.

FIG. 1 is a schematic diagram showing the configuration of the essential portion of a digital camera according to the embodiment of the invention.

A digital camera 100 in FIG. 1 comprises: an image pickup unit 1, an analog front end (AFE) 2, a digital signal processor 3, a driver 4, a lens driver 5, a system controller 6, a movement detector 7, a movement vector operation unit 8, a predicted movement vector operation unit 9 and a differential vector generator 10.

The image pickup unit 1 employs an optical system, including an image taking lens 1a, and an image pickup device 1b, such as a CCD image sensor, to take a picture of an object, and outputs an analog image signal. The optical system, for example, is movable, vertically and horizontally, in order to optically compensate for camera shake.

The AFE 2 performs a predetermined analog signal process for an image pickup signal obtained by the image pickup unit 1, and converts the obtained analog signal into a digital signal. The AFE 2 transmits this digital signal as so-called RAW image data to the digital signal processor 3. The RAW image data are those obtained by digitizing the image pickup signal, without changing the signal form received from the image pickup unit 1.

Under the control of the system controller 6, the driver 4 generates a drive signal at a predetermined timing, and based on this drive signal, drives the image pickup device 1b and the AFE 2.

Further, the lens driver 5, under the control of the system controller 6, moves the optical system, which includes the image taking lens 1a, to a predetermined position.

For the digital image data received from the AFE 2, the digital signal processor 3 performs digital signal processing in a designated operating mode. The processing performed by the digital signal processor 3 includes: a camera shake compensation process, a black level correction process (OB process), a linear matrix correction process, a white balance control process, a gamma correction process, a synchronization process and a Y/C conversion process. The digital signal processor 3 is essentially a DSP device, and image data output by the digital signal processor 3 are compressed and are recorded on a recording medium, such as a memory card.

The movement detector 7 is a sensor for detecting the movement of the digital camera 100, and for this, a gyro sensor or an acceleration sensor, for example, is employed.

The movement vector operation unit 8 employs a sensor signal output by the movement detector 7 to calculate a movement vector that specifies the movement (the direction and the distance) of the digital camera 100.

The predicted movement vector operation unit 9 predicts how the digital camera 100 will be moved after a predetermined period of time has elapsed. Specifically, the movement vectors obtained by the movement vector operation unit 8 are accumulated, and based on the history of the movement vectors thus accumulated, the predicted movement vector operation unit 9 calculates a predicted movement vector, which is a movement vector specifying the movement of the digital camera 100 following the elapse, calculated from the current time, of a predetermined period of time.

The system controller 6, constituted mainly by a processor that executes commands provided by a predetermined program, controls all the operations of the entire digital camera 100, to include a photograph taking process. The system controller 6 moves the optical system, through the lens driver 5, in order to cancel the predicted movement vector previously calculated.

The predetermined period of time described above is a required period extending from the time an optical system moving instruction, for canceling the predicted movement vector, is issued to the lens driver 5 by the system controller 6 to the point at which the optical system actually starts to move. Therefore, in the period during which a photograph is being taken, the exposure is performed, for example, with the shutter open, and the optical system is moved to compensate for the predicted movement of the digital camera 100. When this prediction is correct, near precise compensation for camera shake can be performed.

The differential vector generator 10 obtains a movement vector, which specifies the movement of the digital camera 100 that is detected by the movement detector 7 while a photograph was being taken, and a predicted movement vector, which is produced by the predicted movement vector operation unit 9 and specifies a movement prediction for the digital camera 100 while a photograph was being taken. Then, the differential vector generator 10 subtracts the actual movement vector from the predicted movement vector and generates a differential vector.

The camera shake compensation process performed by the digital signal processor 3 will now be explained.

The camera shake compensation process is a signal process for compensating for an error between the predicted movement of the digital camera 100 while a photograph is being taken, and the actual movement of the digital camera 100 at that time. The digital signal processor 3 employs the differential vector to correct image data obtained for a photograph, so that the image data correspond to those obtained when the optical system was moved while the photograph was being taken, and to thus compensate for the actual movement of the digital camera 100 that was detected by the movement detector 7.

For example, assume that the predicted movement of the digital camera 100 during the taking of a photograph is represented by an upward, two-pixel vector, and that the actual movement of the digital camera 100 at that time is represented by an upward, one-pixel vector. In this case, image data received from the AFE 2 is shifted downward one pixel. Since the differential vector is an upward vector for only one pixel, the digital signal processor 3 performs the signal processing for shifting image data, received from the AFE 2, one pixel upward. As a result, the same image data can be generated as are obtained when the optical system is moved to compensate for the actual movement of the digital camera 100 during the taking of a photograph. Accordingly, accurate camera shake compensation is enabled.

The picture taking operation of the digital camera 100 will now be explained.

When the digital camera 100 is set to the picture taking mode and the camera shake compensation mode, a movement vector is calculated in accordance with a sensor signal transmitted by the movement detector 7. When movement vectors such as this are accumulated, a predicted movement vector is calculated based on them, and the optical system is moved to cancel the thus obtained predicted movement vector. Therefore, in the camera shake compensation mode, the optical system is always moved so as to counter the predicted movement of the digital camera 100. It should be noted, however, that the optical system need not always be moved, and when, for example, the digital camera 100 has an AF function, the optical system maybe moved after the image taking lens 1a has been moved to a focal position using the AF function.

When a picture taking instruction is issued by a user, image data that includes a predetermined number of pixels are output by the AFE 2. Then, the actual movement vector of the digital camera 100, which represents the photograph taking operation performed in accordance with the instruction, is subtracted from the predicted movement vector of the digital camera 100, which also represents the photograph taking operation performed in accordance with the instruction. Thus, a differential vector is generated, and image data output by the AFE 2 are corrected based on this differential vector. Then a predetermined digital signal process is performed for the corrected image data, the resultant data are compressed, and the compressed data are recorded on a recording medium.

As described above, when there is an error between the predicted and the actual movement of the digital camera 100 while a photograph is being taken, this error can be corrected by performing signal processing. Therefore, accurate camera shake compensation can be performed.

Furthermore, since the digital signal processor 3 simply corrects image data based on a differential vector, the processing load imposed on the digital signal processor 3 can be reduced, compared with when camera shake compensation is performed only by the signal processor, without the optical system being moved.

In this embodiment, a differential vector has been generated by subtracting the movement vector from the predicted movement vector. However, a differential vector may also be generated by subtracting a predicted movement vector from a movement vector, and may be employed to correct image data.

According to the invention, for a digital camera having an optical camera shake compensation function, accurate camera shake compensation is enabled.

The entire disclosure of each and every foreign patent application from which the benefit of foreign priority has been claimed in the present application is incorporated herein by reference, as if fully set forth.

What is claimed is:

1. A digital camera, having a function for optically compensating for camera shake, comprising:
    a movement detector that detects a movement of the digital camera;
    a movement prediction unit that employs the movement detected by the movement detector to predict a movement of the digital camera after a predetermined period of time has elapsed;
    an optical system moving unit that moves an optical system of the digital camera so as to compensate for the movement of the digital camera predicted by the movement prediction unit; and
    an image data correction unit that corrects image data obtained while taking a photograph, based on a difference between an actual movement of the digital camera, which is detected by the movement detector while taking the photograph, and the movement of the digital camera that is predicted, by the movement prediction unit, to occur while taking the photograph, so that the image data will be the same as image data that are obtained when the optical system is moved while taking the photograph in order to compensate for the movement of the digital camera that is detected by the movement detector while actually taking the photograph.

* * * * *